(12) United States Patent
Terrano

(10) Patent No.: US 10,679,410 B2
(45) Date of Patent: Jun. 9, 2020

(54) DISPLAY OPACITY CONTROL FOR PREVENTING VIEW OCCLUSION IN ARTIFICIAL REALITY

(71) Applicant: Facebook Technologies, LLC., Menlo Park, CA (US)

(72) Inventor: Mark Terrano, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/132,194

(22) Filed: Sep. 14, 2018

(65) Prior Publication Data
US 2020/0090401 A1   Mar. 19, 2020

(51) Int. Cl.
| | |
|---|---|
| *G06K 9/00* | (2006.01) |
| *G06F 3/01* | (2006.01) |
| *G10L 15/22* | (2006.01) |
| *G06T 19/00* | (2011.01) |
| *H04R 3/00* | (2006.01) |
| *G06T 17/20* | (2006.01) |
| *G06F 3/0481* | (2013.01) |

(52) U.S. Cl.
CPC .............. *G06T 17/20* (2013.01); *G06F 3/013* (2013.01); *G06F 3/04817* (2013.01); *G06K 9/00288* (2013.01); *G06K 9/00671* (2013.01); *G06T 19/006* (2013.01); *G10L 15/22* (2013.01); *H04R 3/005* (2013.01)

(58) Field of Classification Search
None
See application file for complete search history.

(56) References Cited

U.S. PATENT DOCUMENTS

| | | | |
|---|---|---|---|
| 2013/0044130 A1* | 2/2013 | Geisner | G09G 5/00 345/633 |
| 2013/0328925 A1* | 12/2013 | Latta | G09G 3/003 345/633 |
| 2015/0235434 A1* | 8/2015 | Miller | G06T 19/006 345/633 |
| 2016/0320625 A1* | 11/2016 | von und zu Liechtenstein G02B 27/0179 | |
| 2017/0131764 A1* | 5/2017 | Bognar | G06T 7/50 |

* cited by examiner

*Primary Examiner* — Edward Martello
(74) *Attorney, Agent, or Firm* — Baker Botts L.L.P.

(57) ABSTRACT

In one embodiment, the artificial reality system displays a virtual content to a first user. The virtual content has a first opacity. The system determines a first vergence distance of the first user and compare the first vergence distance of the first user to a first distance between the virtual content and the first user. The system adjusts the virtual content to have a second opacity that is less opaque than the first opacity in response to a determination that the first vergence distance of the first user is greater than the first distance by a first threshold distance.

22 Claims, 11 Drawing Sheets

DISPLAY OPACITY CONTROL FOR PREVENTING VIEW OCCLUSION IN ARTIFICIAL REALITY

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of changing opacity of virtual display panels to allow a user to see through the panels when the user needs to look at objects behind the panels. Particular embodiments may use eye tracking cameras to determine the user's vergence distance and control the panels' opacity accordingly based on the user's vergence distance. For example, the panel background may change to transparent or translucent when the user's vergence distance moves beyond the panel (indicating the user is trying to look at objects behind the panel). In some embodiments, the system may use face or/and voice recognition to determine that the user is interacting with another person (e.g., in a conversation) and reduce the opacity of the panel accordingly to allow the user to see through the panel to interact the other person. The panels may be completely transparent or translucent to keep on displaying some minimal content, such as text, lines, or frames.

In particular embodiments, when a virtual panel is made transparent, the virtual panel may have one or more persistent visual anchors (e.g., a corner fitting object, a title bar, text contents, lines, or frames), which are associated with that panel and are constantly displayed regardless of the panel's opacity. When the user wants to see the panel that was made transparent, the user may look at the visual anchors associated with that panel and the panel would automatically reappear.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
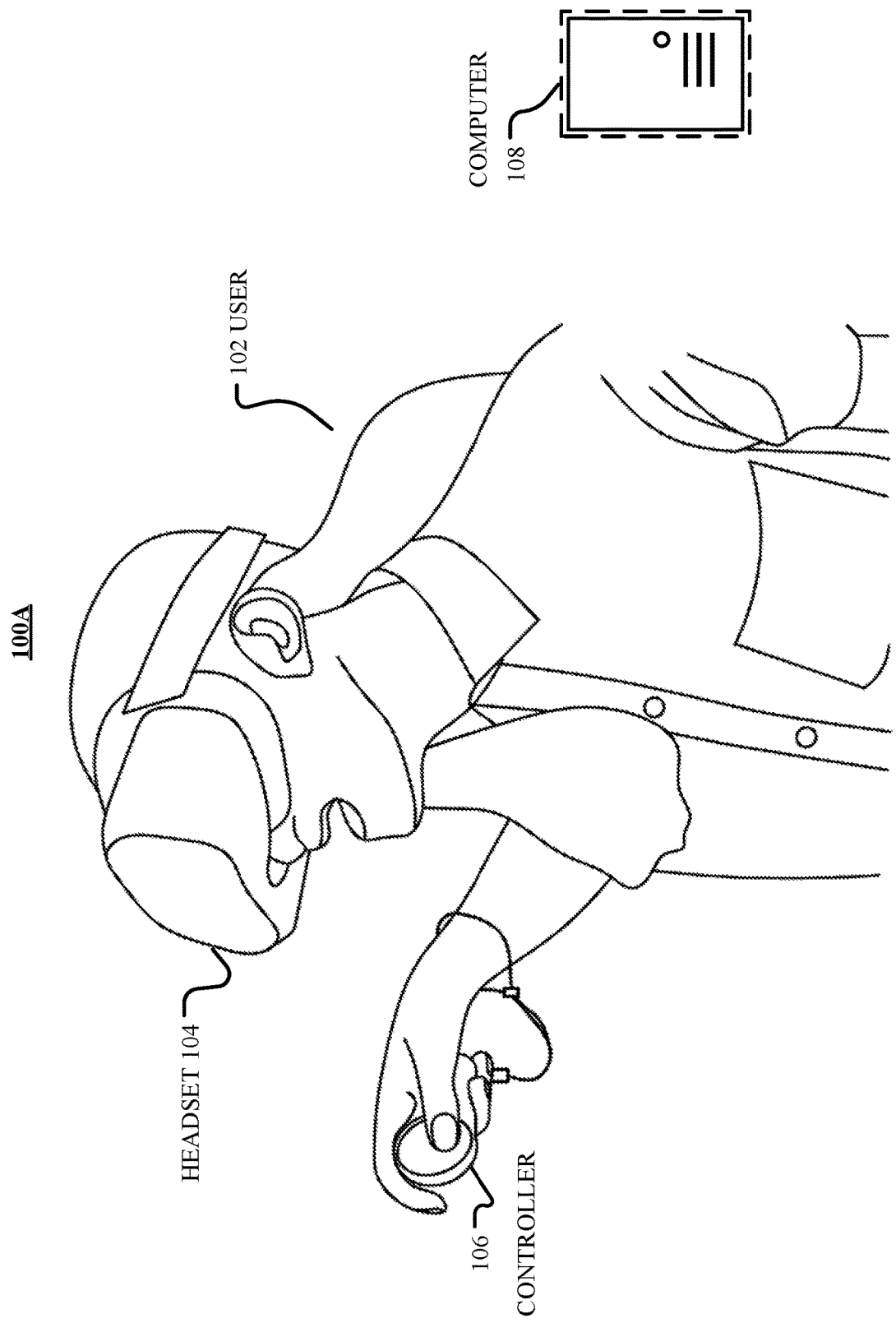
FIGS. 1A-1B illustrate example artificial reality systems.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
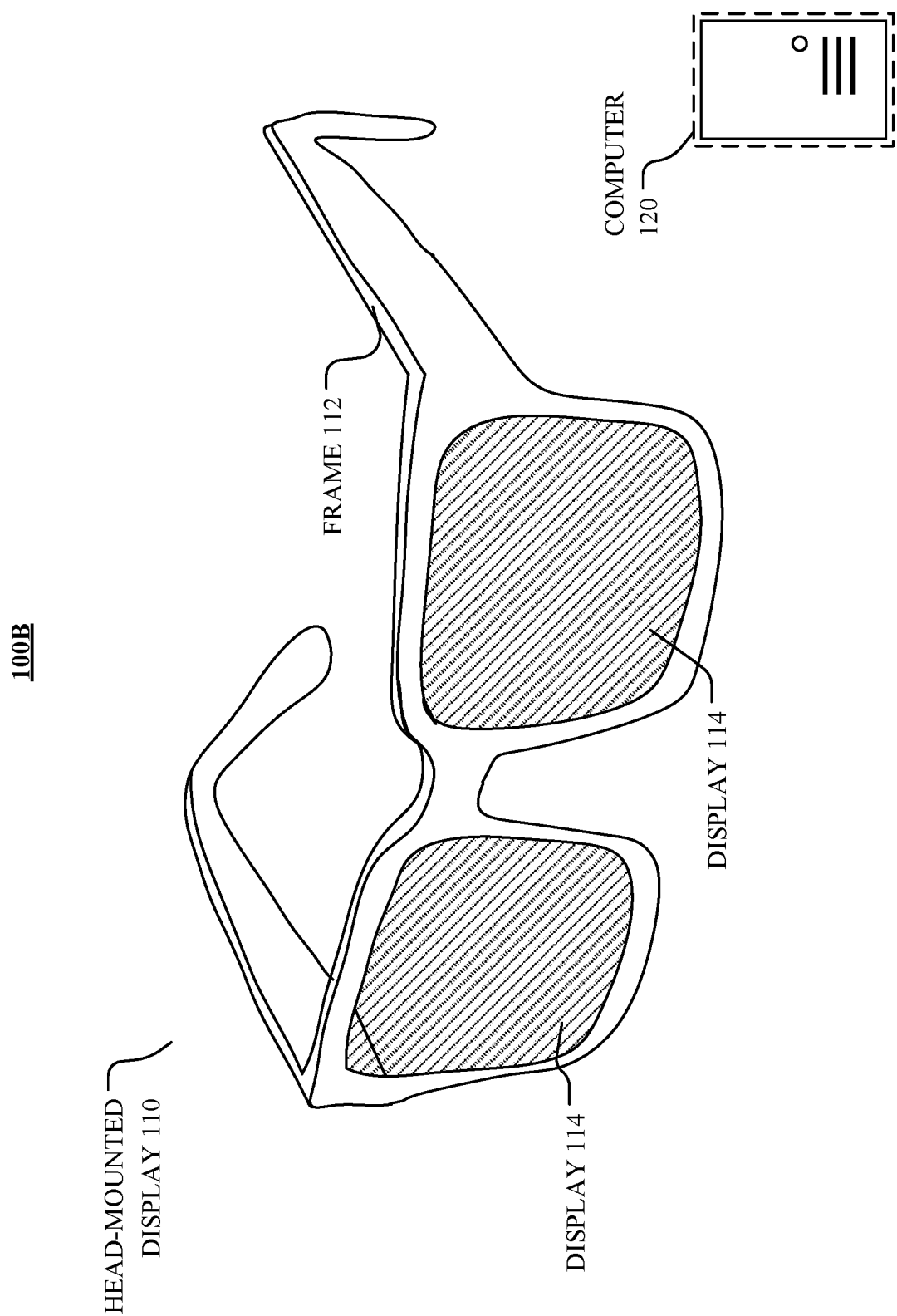

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Artificial reality systems (e.g., augmented reality, virtual reality, mixed reality, etc.) may use virtual panels to display information to a user. The virtual panels, which are typically opaque, may serve the user well for some activities like reading or working. However, in some situations, the opaque virtual panels may cause problems to the user wearing the headset by blocking the user from seeing through the panels. For example, the opaque panels rendered on an augmented reality headset may block the user who is wearing the headset from seeing other users beyond these panels. In some other situations, the opaque panels may create hazard for the user by preventing the user from seeing the objects behind the panels. For example, when the user wearing an augmented reality headset starts to walk after looking at a map on an opaque virtual panel rendered by the headset, the user may walk into some real-world objects (e.g., barriers, poles, vehicles, other pedestrians, etc.) because the opaque panel is obstructing the user's view in one or more directions. Particular embodiments solve this problem by automatically making the virtual display panel disappear so that the user can look through the panel when the user indicates or needs to do that. Particular embodiments may automatically determine the user's indications (e.g., vergence distance being beyond the virtual panel) or needs (e.g., starting to move after looking at a map rendered on a headset) for looking through the panel and adjust the opacity of the panel to allow the user to look through.

Particular embodiments may adjust the opacity of the virtual panel to make the panel disappear or reappear based on where the user is looking at (e.g., vergence distance). However, once the virtual panel is made to disappear, it is difficult for the user to focus his eye on the virtual panel since the panel is invisible to the user. Particular embodiments solve this problem by displaying one or more visual anchors for the disappeared virtual panel. Particular embodiments may make the disappeared virtual panel reappear when the user gazes at the associated visual anchors. The virtual panel may disappear and re-appear automatically when the user moves his/her eyes off and onto the virtual panel back and forth.

Figure 2:
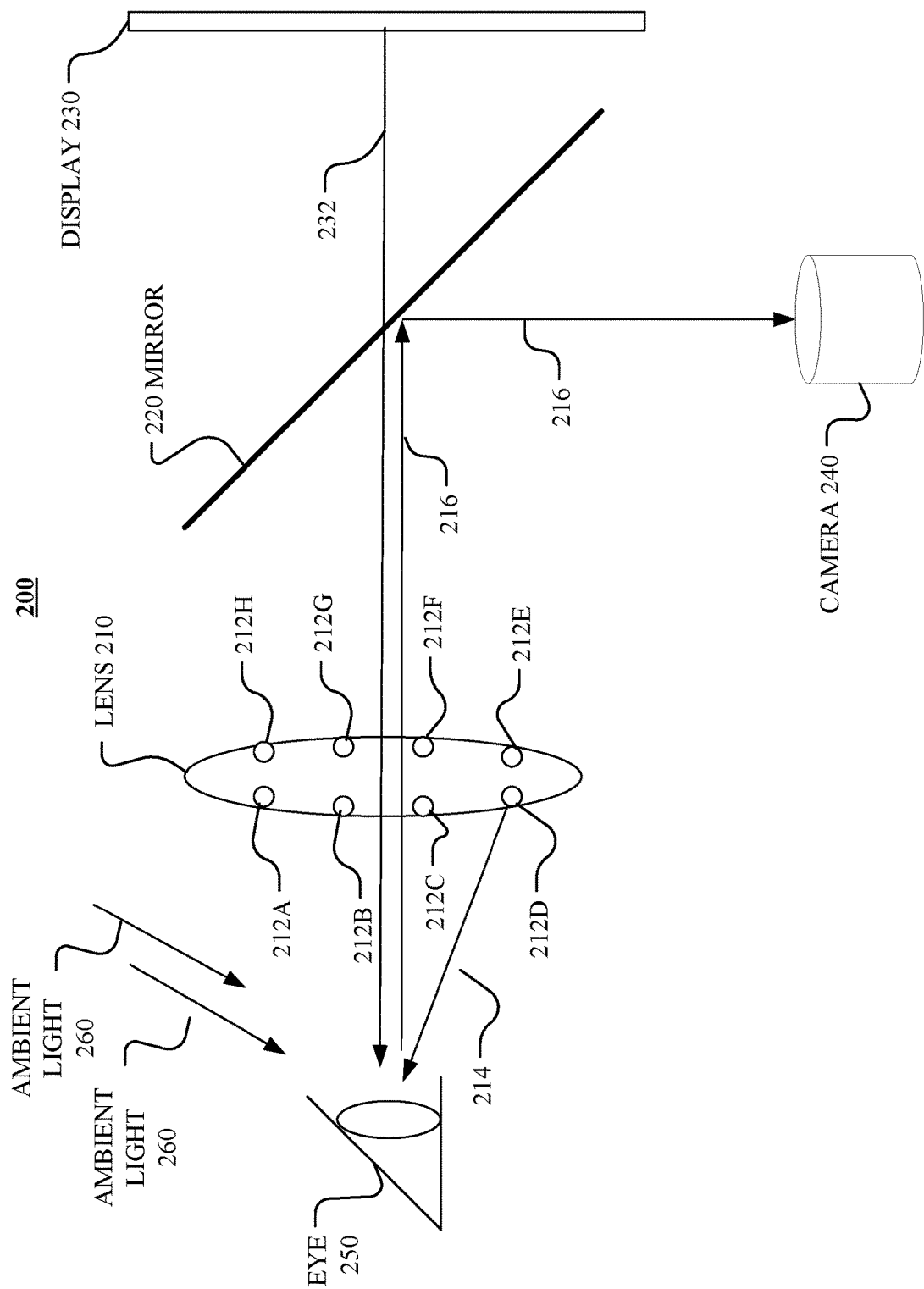
FIG. 2 illustrates an example 3D eye tracking system.

In particular embodiments, the artificial reality system may include an eye tracking system for tracking the user's eyes in real time. The eye tracking system may be a 3D eye tracking system tracking the user's eye movements (e.g., gazing direction, gazing angle, convergence) and determine where the user is looking at (e.g., vergence distance or gazing point). FIG. 2 illustrates an example 3D eye tracking system 200. The 3D eye tracking system 200 may track the three-dimensional eye movement to determine the user's vergence distance or gazing point. The vergence distance of a user may be a distance from the user's eyes to a point which the user's eyes are converged at. A gazing point of a user may be a point that the user is gazing at. The eye tracking system 200 may include a lens 210, a number of infrared light sources (e.g., 212A-H), a hot mirror 220, and an infrared camera 240. The light sources 212A-H may be infrared light emitting diodes (LEDs) mounted on the lens 210. The hot mirror 220 may be a dichroic filter which reflects infrared light while allowing visible light to pass. The emitted infrared light (e.g., 214) by one or more of the light source 212A-H may reach and be reflected off the eye 250. The reflected light 216 may be further reflected by the hot mirror 220 and reach the infrared camera 240. The camera 240 may be an infrared camera capturing images of the eye 250 using the reflected infrared light. The eye tracking system 200 may capture images of both eyes (e.g., pupils) of the user and process the images using computer vision technology. The eye tracking system 200 may measure the angle of the two eyes and use geometric relations to determine the vergence distance and gazing point of the user. The 3D eye tracking system 200 may measure the user's eye angle with an accuracy of 1 degree, for example. The visible light 232 from the display screen 230 may pass the hot mirror 220 and the lens 210 to reach the eye 250 allowing the user to see rendered content by the display screen 230. In particular embodiments, the 3D eye tracking system 200 may use the ambient light 260 from the environment to capture the eye images. The ambient light 240 may reach the eye 250 and may be reflected off the eye 250. The reflected light may pass through the lens 210 and reach the hot mirror 220 and the camera 240. The camera 240 may capture images of the eye 250 based on the ambient light reflected off the eye 250. In particular embodiments, the 3D eye tracking system may use a hybrid method using both light sources (e.g., 212A-212H) and the ambient light 260 to capture eye images and track the eye movements.

In particular embodiments, the artificial reality headset system may use a machine learning (ML) based approach for eye tracking. The headset system may take a sequence of images of the eyes of the user wearing the headset (e.g., using a camera of a 3D eye tracking system) and use the machine learning (ML) algorithm to process the images and output vergence information. For example, the machine learning (ML) algorithm may include an inference model to determine the vergence distance and gazing point of the user. In particular embodiments, the headset system may include a hybrid approach combining 3D eye tracking and ML-based eye tracking.

In particular embodiments, the artificial reality system may determine vergence distance and gazing point of the user using a combination of approaches. The approaches may include, for example, but are not limited to, eye-tracking based approaches (e.g., 3D eye tracking, ML based eye tracking), body-based approaches (e.g., head position/movement, hand position/movement, body position/movement), and content-based approaches (e.g., Z-buffer, face/object recognition, developer provided information). U.S. patent application Ser. No. 16/132,153, entitled "Vergence Determination," filed on 14 Sep. 2018, which is incorporated by reference as an example only and not by way of limitation, discloses examples of determining vergence distance or gazing point using different combination of approaches.

In particular embodiments, the artificial reality headset may display one or more virtual panels to the user wearing an artificial reality headset. The virtual panels may display computer-generated screens to the user for activities such as reading or working. The virtual panels may display one or more display contents including, for example, but not limited to, a three-dimensional object, a text, an image, an illustration, an icon, a user interface (UI), a multimedia content, a website content, a game content, a social network content, a calendar, a clock, a document content, etc. The virtual panels may be opaque or may have an opacity that enables the displayed content to be clearly visible to the user. The opaque or highly opaque virtual panels (e.g., panels with opacity above 0.5, 0.7, 0.9, etc.) may block the user from seeing objects or people behind the panels. For example, a user wearing an augmented reality headset may use the opaque virtual panels for viewing a map. The opaque virtual panels displaying the map information may block the user from seeing the environment that the user is walking in. As another example, the opaque virtual panels displaying information to a first user may interfere with an interaction between the first user with other users by blocking or interfering with the view of the first user. As another example, a user may view a manual on an opaque virtual panel overlaid on a machinery that the user is working on. The user may not able to see the part of the machinery that is behind the opaque virtual panel.

In particular embodiments, the artificial reality system may display a virtual panel having a first opacity to a user. The virtual panel may be displayed at a fixed distance (e.g., 1 m) from the user in a virtual space of artificial reality. The virtual panel having the first opacity may block the user from seeing through the virtual panel. The system may automatically detect an indication that the user wants or needs to look through the virtual panel. In response, the system may adjust the opacity of the virtual panel to allow the user to look through it. As an example and not by way of limitation, the system may use an eye tracking system to constantly monitor the user eye movement and determine the vergence distance of the user based on the eye tracking data. The system may compare the vergence distance of the user to the distance between the virtual panel and the user. In response to a determination that the vergence distance of the user is greater than the distance between the virtual panel and the user by a first threshold distance, the system may adjust the virtual panel to have a second opacity which is less opaque than the first opacity. The virtual panel having the second opacity may allow the user to see through the virtual panel. For example, the virtual panels having the second opacity may be transparent or translucent to the user and allow the user to see objects behind the virtual panel.

In particular embodiments, the system may adjust the opacity of the virtual panel and the opacity of the display content on the panel differently. The display content may have the same opacity or different opacity with the virtual panel which is the background to the display content. When the system adjusts the virtual panel from the first opacity (e.g., opaque) to the second opacity (e.g., transparent), the system may adjust the display content opacity to a fourth opacity. The fourth opacity may be equal to or more opaque than the second opacity. As an example and not by way of limitation, the virtual panel and display content may both become transparent or translucent with the same opacity and allow the user to see through. As another example, the virtual panel may be transparent but the display content may be opaque or translucent. As another example, the virtual panel including the display content may be transformed to other visual forms such as a wireframe which allow the user to see through. As another example, the virtual panel including the display elements may be partially visible to the user. The virtual panel may keep one portion of the panel visible to the user and hide other portions of the panel from the user. As another example, the virtual panel may keep one or more elements (e.g., text, icons, images) of the display content visible to the user and hide the rest of the display content.

In particular embodiments, the virtual panel having the second opacity (e.g., transparent or translucent) may have one or more visual anchors associated with the virtual panel. The visual anchors may have a third opacity which may be more opaque than the second opacity. The third opacity may allow the visual anchors to be visible to the user. In particular embodiments, the visual anchors may be persistently displayed to the user both before and after the associated virtual panel is made transparent or translucent. In particular embodiments, the visual anchors may be displayed to the user only after the virtual panel is made transparent or translucent. In particular embodiments, the visual anchors may be displayed in an unintrusive manner to the view of the user. For example, the visual anchors may be located at a corner of the associated virtual panel or other portions (e.g., an area close to edge) of the virtual panel that is uninstrusive to the view of the first user. In particular embodiments, the visual anchor may include, for example, but are not limited to, a corner fitting object, a wireframe of the virtual panel, a title bar of the virtual panel, a line associated with the virtual panel, a dot associated with the virtual panel, an outline of contents of the virtual panel, an opaque display element of the virtual panel, a translucent display element of the virtual panel, a text content of the virtual panel, an icon, a translucent virtual panel, a virtual panel with a reduced size, etc.

In particular embodiments, the artificial reality system may determine that the user is looking at the one or more visual anchors associated with a virtual panel that was made transparent, and adjust the opacity of the virtual panel opacity to make it reappear to the first user. As an example and not by way of limitation, the system may compare the vergence distance of the user to the distance between the disappeared virtual panel and the user. If the different between the vergence distance of the user and the distance between the disappeared virtual panel and the user is within a second threshold distance, the system may determine that the user is looking at the visual anchor. As another example, the system may measure the gazing point of the user using an eye tracking system. The system may determine that the user is looking at a visual anchor of a disappeared virtual panel by comparing the gazing point the user with the location of the visual anchor. When the gazing point of the user falls within a third threshold distance to the location of the visual anchor, the system may determine that the user is looking at that visual anchor.

In particular embodiments, in response to a determination that the user is looking at the visual anchor associated with a transparent or translucent virtual panel, the system may adjust the opacity of the virtual panel to have a third opacity. The third opacity may be more opaque than the second opacity and may make the virtual panel visible to the user. For example, the third opacity may be equal to the first opacity of the virtual panel before the panel was made transparent. As another example, the third opacity may have any other opacity value that allows the first user to clearly see the display content on the panel. In particular embodiments, the system may adjust the opacity of the virtual panel accordingly after determining that the user has been looking at the virtual anchor for a period of time (e.g., 0.5 second, 1 second, 2 seconds).

In particular embodiments, the system may change the opacity of the virtual panel gradually and the opacity value of the virtual panel may be calculated based on the user's vergence distance value or gazing point location. As an example and not by way of limitation, when the vergence distance or gazing point of the user moves from a far distance back to the virtual panel, the closer the vergence distance or gazing point to the virtual panel, the more opaque the virtual panel becomes. In particular embodiments, the system may change the opacity of the virtual panel in a speed corresponding to a changing speed of the vergence distance or gazing point of the user. As an example and not by way of limitation, when the vergence distance changes from a far distance back to the virtual panel, the faster the vergence distance changes, the faster the virtual panel becomes more opaque.

In particular embodiments, the virtual panel that has been changed to transparent or translucent may not include a virtual anchor. The system may purely rely on the vergence distance of the user to bring back the virtual panel. For example, the system may store the distance value of the distance between the virtual panel in the computer memory. The system may compare the vergence distance of the user with the stored distance value of the virtual panel. If the difference between the vergence distance of the user and the stored distance value is within a threshold distance, the system may increase the opacity of the virtual panel to make it visible. The user may simply glance through an area of space along one or more dimensions and the system may automatically display or hide a series of virtual panels to the user based on the location of the virtual panel and the vergence distance of the user.

In particular embodiments, the system may adjust the opacity of one or more virtual panels upon detection or determination of one or more triggering conditions. The triggering conditions may include an indication that the user is looking through the virtual panels. As an example and not by way of limitation, the system may use a 3D eye tracking system to track the eye movement (e.g., gazing direction, gazing angle, vergence) of the user to determine where the user is looking at (e.g., vergence distance, gazing point) in a virtual space or in a real-world space. When the vergence distance or gazing point of the user is beyond the virtual panel for a threshold distance and the virtual panel interferes with the user's view, the system may identify that as an indication of the user wants to look through the virtual panel and the virtual panel needs to be dismissed. In particular embodiments, the system may determine that that the user wants to look through the virtual panel when the user's vergence distance is beyond the virtual panel for a time period longer than a threshold time period (e.g., 0.5 seconds, 1 second, 2 seconds). In particular embodiments, the vergence distance of the user may be determined using one or more cameras associated with the eye tracking system. In particular embodiments, the vergence distance of the user may be determined using one or more cameras associated with a third-parity system (e.g., a user-facing camera in a vehicle, a user-facing camera on a computer, or a user-facing camera in an office environment). In particular embodiments, the system may determine the user's gazing direction using the eye tracking system and determine that the virtual panel interferes the view of the user when virtual panel is at least partially within a threshold angle to the user's gazing direction.

In particular embodiments, the system may detect the user's indication to look through a virtual panel based on comparison of the user gazing point and an identified object located beyond the virtual panel. As an example and not by way of limitation, the system may measure a vergence movement of the user using an eye tracking system and determine the gazing point of the user. The system may use one or more cameras and an object recognition model to identify an object which is located beyond/behind the virtual panel. The cameras may be forward-facing cameras associated with the headset worn by the user. The system may compare the gazing point of the user and the location of the identified object and determine that the user is looking at that object if the gazing point of the user is within a threshold distance to the location of the identified object. In particular embodiments, the system may determine that that the user is looking at the object when the user's gazing point is on or near that object for a time period longer than a threshold time period (e.g., 0.5 seconds, 1 second, 2 seconds). The system may further determine that the virtual panel is interfering with the user's view. In particular embodiments, the system may determine a gazing direction or a view range of the user using the eye tracking system. The system may determine that the virtual panel interferes the view of the user when virtual panel is at least partially within a threshold angle to the user's gazing direction or is at least partially within the view range of the user. Based on these determinations, the system may conclude that the user wants to look through or beyond the panel and adjust the opacity of the virtual panels to allow the user to see through it.

In particular embodiments, the system may determine the user desires to look through a virtual panel based on the user's gazing direction. As an example and not by way of limitation, the system may use one or more sensors (e.g., accelerometer, gyroscope, level sensor) to track the user's head (e.g., position, status, movement). The system may determine the head direction of the user based on the sensor data and further determine the user's gazing direction based on data from the eye tracking system. When the gazing direction of the user is pointing to an object or person (e.g., identified by object/face recognition model) located beyond the virtual panel and the virtual panel interferes the view of the user, the system may identify that as an indication that the user wants to look through or beyond the panel. In particular embodiments, the system may determine that the virtual panel is at least partially within a threshold angle to the user's gazing direction and determine that the virtual panel interferes the view of the user. In particular embodiments, the system may determine a gazing angle of the user using the eye tracking system and determine a view range of the user based on the gazing direction and the gazing angle of the user. The system may determine that the virtual panel interferes the of view of the user if the virtual panel is at least partially within the view range of the user determined based on the gazing direction and gazing angle.

In particular embodiments, the system may determine that the user is looking at an object beyond a virtual panel based on the correlation between the gazing point or gazing direction of the user and the object in the field of view of the user. As an example and not by way of limitation, the system may determine that the motion the user's gazing point or gazing direction corresponds to the motion of the object in the field of view. The system may determine that the user's eyes are looking at and following the object which is within the field of view of the user and beyond the virtual panel. The system may determine that the virtual panel is within the field of view of the user and interferes with the user's view. The system may infer that the user desires to look through the virtual panel and dismiss the virtual panel to avoid inferencing with the user's view.

In particular embodiments, the system may use one or more sensors to measure and track the movement of the user's body to detect the user's indication or intention to look through a virtual panel. As an example and not by way of limitation, the user may look at a map rendered on an opaque virtual panel by an augmented reality headset. The system may detect, using an accelerator and other motion sensors, that the user starts to move (e.g., walking, running, riding a bicycle, or driving a vehicle) after looking at a map displayed on the opaque virtual panel. The system may determine that the user's movement as an indication that the user needs to look through the panel. The system may determine a moving direction of the user and determine that the virtual panel interferes with the user's view along the moving direction. The system may dismiss the interfering virtual panel or all displayed virtual panels to allow the user to see the environment and avoid running into hazardous objects.

In particular embodiments, the system may use one or more sensors (e.g., accelerometers, cameras, microphones) to track the activities of a first user wearing the headset and the activities of one or more second users near the first user. As an example and not by way of limitation, the system may use one or more cameras with a face recognition model to detect a face of a second user in the field of view of the first user who is wearing the headset. The cameras used for the face detection may be associated with the headset (e.g., forward-facing or side-facing cameras of the headset) or may be associated with a third-party system (e.g., a vehicle) and communicate with the headset system. The system may recognize the second user nearby is a friend of the first user based on a social graph of a social network system of which both the first and second users are members. The system may infer that the first user is likely to interact with the second user. Based on the recognition of the second user and the interference caused by the virtual panel to the first user' view, the system may infer that the first user may want to look through the virtual panel. In particular embodiments, the system may determine a social relevance score (e.g., affinity, degree of separation, geographic relevance) of the second user to the first user based on the social graph of the social network system. When the social relevance score is above a pre-determined or adaptively determined threshold, the system may change the opacity of the virtual panel to allow the first user to see the second user.

In particular embodiments, the system may detect an interaction between the first user wearing the artificial reality headset and a second user in the field of view of the first user. The system may use computer vision algorithms to detect activities (e.g., a movement, a gesture, a behavior) of the first or/and the second user and determine the interaction between them. As an example and not by way of limitation, the system may detect that the second is user is waving his hand toward the first user and may identify that as an interaction between the second and the first user. The system may further use one or more microphones to capture a voice of the first or/and the second user and determine that a conversion is going on between the first and second users. The system may change the opacity of the virtual panel to allow the first user to see the second user without the interference from the virtual panel.

In particular embodiments, the system may determine the vergence distance of the user based on one or more secondary factors associated with an object that the user is looking at. The factors may include, for example, but are not limited to, a gesture of the user, a voice command of the user, a correlation between the object that the user is looking at and a behavior of the user, a user selection, or a user input. As an example and not by way of limitation, the system may detect a pre-determined gesture (e.g., point to an object) or voice command (e.g., mentioning an object) of the user and change the opacity of the virtual panel to void blocking or interfering the user's view. The user may also use a controller to manually select and dismiss the virtual panel.

In particular embodiments, the system may relocate the virtual panel to a new location or resize the virtual panel to a smaller size to void blocking or interfering with the user's view. In particular embodiments, the virtual panels and displaying elements may be relocated in the field of view of user or may be moved out of the field of view of the user to avoid blocking or interfering with the user's view. As an example and not by way of limitation, the system may determine that the user is looking at an object or person located beyond the virtual panel. The system may determine that the virtual panel is at least partially within a threshold angle to the gazing direction of the user, and therefore, interferes the view of the user. Upon the determination of interference, the system may relocate the virtual panel to a new location to void blocking or interfering the user' view. A visual anchor may be displayed at a corner of the virtual panel's original position. When the user looks at the visual anchor, the virtual panel may automatically fly back to its original position. As another example, the virtual panel may be resized to a smaller size to void blocking or interfering the user' view. The virtual panel with reduce size may be positioned at a corner of the original virtual panel and may serve as the visual anchor to bring the panel back to its original size. When the user is looking at the small virtual panel with reduced size at the corner, the virtual panel may automatically expand from the corner back to its original size.

In particular embodiments, the artificial reality headset may display one or more virtual objects (e.g., 3D objects 2D objects) directly to the user wearing the artificial reality headset without using any virtual panels. In particular embodiments, the headset may render a 3D object (e.g., a 3D machine gear) which may appear to be directly floating in the air to the user and may be not associated to any virtual panels. The 3D object may have a first opacity (e.g., opaque) that may block the user from seeing through the 3D object. When the headset detects that the user indicates or needs to look through the rendered 3D object, the headset may adjust the opacity of the 3D object to a second opacity which is less opaque (e.g., transparent, translucent) than the first opacity and allow the user to see through the 3D object. In particular embodiments, the headset may resize the 3D object to a smaller size or relocate the 3D object to a new location to avoid blocking the view of the user. The 3D object may have an associated visual anchor, for example, a small 3D object in a corner-fitting size or a visual anchor similar to those of the virtual panels described in this disclosure. The visual anchor may be displayed, for example, at a corner of the 3D object. The visual anchor may be constantly displayed to the user when the 3D object becomes transparent or translucent. When the headset detects that the user is looking at the visual anchor, the headset may adjust the opacity of the transparent or translucent 3D object to be more opaque to allow the user to clearly see the 3D object. In particular embodiments, the headset may resize or relocate the 3D object to allow the user to have a clear view of the 3D object.

Figure 3A:
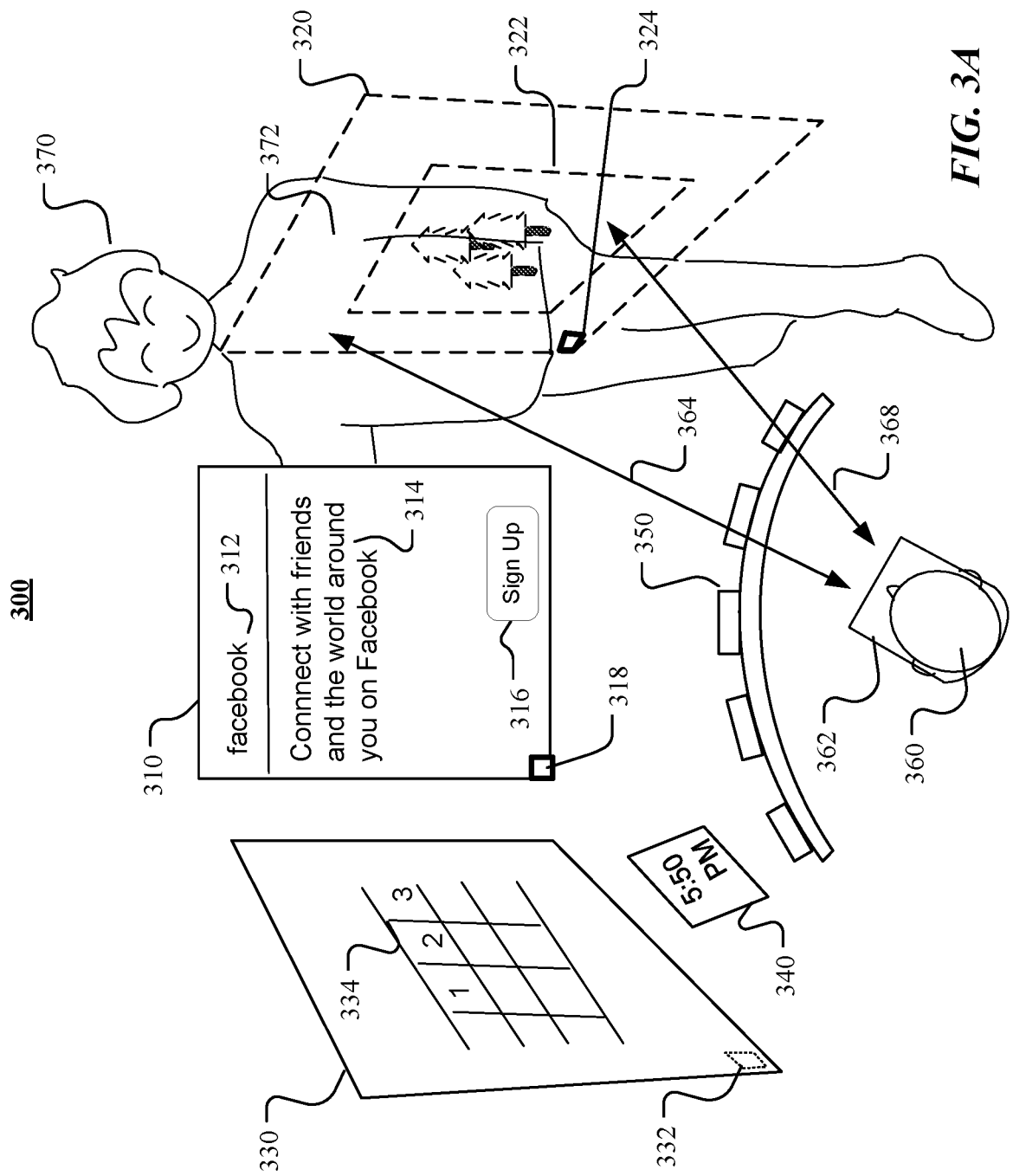
FIG. 3A illustrates an example usage of an artificial reality system by a first user interacting with a second user behind virtual display panels.

FIG. 3A illustrates an example usage of an artificial reality system 300 by a first user 360 interacting with a second user 370 behind virtual display panels. The artificial reality system 300 may include a wearable headset 362 worn by the first user 360 for reading or working activities. The headset 360 may render a number of virtual panels (e.g., 310, 320, 330, 340) to display information to the first user 360. For example, the virtual panels 310, 320, 330, and 340 may display a web content (e.g., a title 310, a text content 314, a button 316, etc.), a picture 322, a calendar 334, and a clock 340, respectively. The headset 362 may also render a virtual keyboard 350 for the first user 360 to interact with the artificial reality system 300. The virtual panels (e.g., 310, 320, 330, 340) may be arranged around the first user 360 at a pre-determined distance (e.g., 1 m) from the first user 360. For example, the virtual panel 310 may be displayed in the front of the first user 360. The virtual panels 320 and 330 may face the first user 360 and be displayed on the right-front and left-front side of the first user 360, respectively. The virtual panel 340 may be displayed at a lower position than the virtual panel 330 and may have a smaller size. The virtual panels may have the same distance or different distances to the first user 360. When the first user is interacting with the virtual panels (e.g., reading information on the virtual panel 310 or viewing the picture 322 on the virtual panel 320), a second user 370 may show up in the field of view of the first user 360, for example, walking toward the first user 360 or standing in front of the first user 360. The system 300 may adjust the opacity of one or more virtual panels upon detection or determination of one or more triggering conditions.

As an example and not by way of limitation, the first user 360 may be looking at the virtual panel 320 at the gazing direction 368 when noticing the second user 370. The first user may move his eyes from the virtual panel 320 to the second user 370. The system 300 may use an eye tracking system to tack the vergence movement of the first user 360 and determine the vergence distance of the first user 360. The system 300 may compare the vergence distance of the first user 360 to the distance from the virtual panel 320 to the first user 360. When the vergence distance of the first user 360 is beyond the virtual panel 320 for a threshold distance (e.g., a threshold distance corresponding to the minimum resolution of the eye tracking system), the system 300 may determine that the first user 260 is looking at a point beyond the virtual panel 320. The system 300 may determine the gazing direction 364 of the first user 360 using the eye tracking system and one or more other sensors. The system 300 may determine that the virtual panel 320 is at least partially within a threshold angle (e.g., 15°, 30°, 60°, 90°) to the gazing direction 364 of the first user 360 and interferes with the view of the first user 360. The system 300 may identify the fact that the user is looking at a point beyond the virtual panel 320 and the virtual panel 320 interferes with the first user's view as an indication that the first user 360 wishes to look through the virtual panel 320. The system 300 may further determine a gazing direction and gazing angle of the first user using the eye tracking system and one or more sensors. The system 300 may determine a view of the first user based on the gazing direction and gazing angle and compare the view to the area covered by the virtual panel 320. The system 300 may determine that the virtual panel 320 interferes with the view of the first user 360 who is looking at the second user 370 and identify that as the indication that the first user 360 wishes to look through the virtual panel 320.

As another example and not by way of limitation, the system 300 may detect an interaction (e.g., a conversation) between the first user 360 and the second user 370. The system 300 may recognize the face of the second user 370 using one or more cameras and a face recognition model. The system 300 may detect a gesture or behavior of the first user 360 or/and the second user 370, such as, waving a hand or nodding head. The system 300 may further detect a voice (e.g., mentioning a person's name) of the first user or/and the second user. The system 300 may determine, based on the detected gesture, behavior, or/and voice, that the first user 360 and the second user 370 have an ongoing conversation. The system 300 may determine that the virtual panel 320 may at least partially interfere with the view of the first user 360. The system 300 may identified the conversation and the interference as the indication that the first user 360 wants to look through the virtual panel 320.

In particular embodiments, the system 300 may change the opacity of the virtual panels that are interfering with the view of the first user 360 upon detection of the indication of the first user 360. As an example and not by way of limitation, when the first user 360 is looking at and having a conversation with the second user 370, the virtual panel 320 may block the first user 360 from seeing at least a part of the second user's body (e.g., body part 372). The system 300 may change the opacity of the virtual panel 320 to transparent to allow the first user to see the second user without inference from the virtual panel 320. In particular embodiments, the system 300 may also hide the virtual panel 310 since it also partially interferes with the view of the first user 360 looking at the second user 370. The opacity virtual panels 330 and 340 may or may not be adjusted since they are not interfering with the first user's view for interacting with the second user 370.

In particular embodiments, when a virtual panel (e.g., 320) is turned into transparent or translucent, one or more visual anchors may be displayed to indicate the disappeared virtual panel. As an example and not by way of limitation, when the virtual panel 320 becomes transparent, the visual anchor 324 may be displayed at a corner of the transparent virtual panel 320 in an unintrusive manner to the view of the first user 360. The visual anchor 324 may be a corner-fitting object or an icon associated with the virtual panel 320. The visual anchor 324 may have an opacity that enables a clear visual effect to the first user 360. When the first user 360 ends the interaction with the second user 370 and wants to bring back the virtual panel 320, the first user 360 may focus his/her eyes on the visual anchor 324. The system 300 may detect that the first user 360 is looking at the visual anchor 324 and adjust the opacity of the virtual panel 320 to make it visible. In particular embodiments, the virtual anchor may be displayed only when the associated virtual panel has been made transparent or translucent. In particular embodiments, the virtual anchor may be displayed both when the associated virtual panel is visible and when the associated virtual panel is made transparent. As an example and not by way of limitation, the visual anchor 318 associated with the virtual panel 310 may be displayed (e.g., at a corner of the virtual panel 310) when the virtual panel 310 is visible to the first user 360. As another example, the visual anchor 332 associated with the virtual panel 332 may be transparent or translucent when the virtual panel 330 is visible to the first user 360.

Figure 3B:
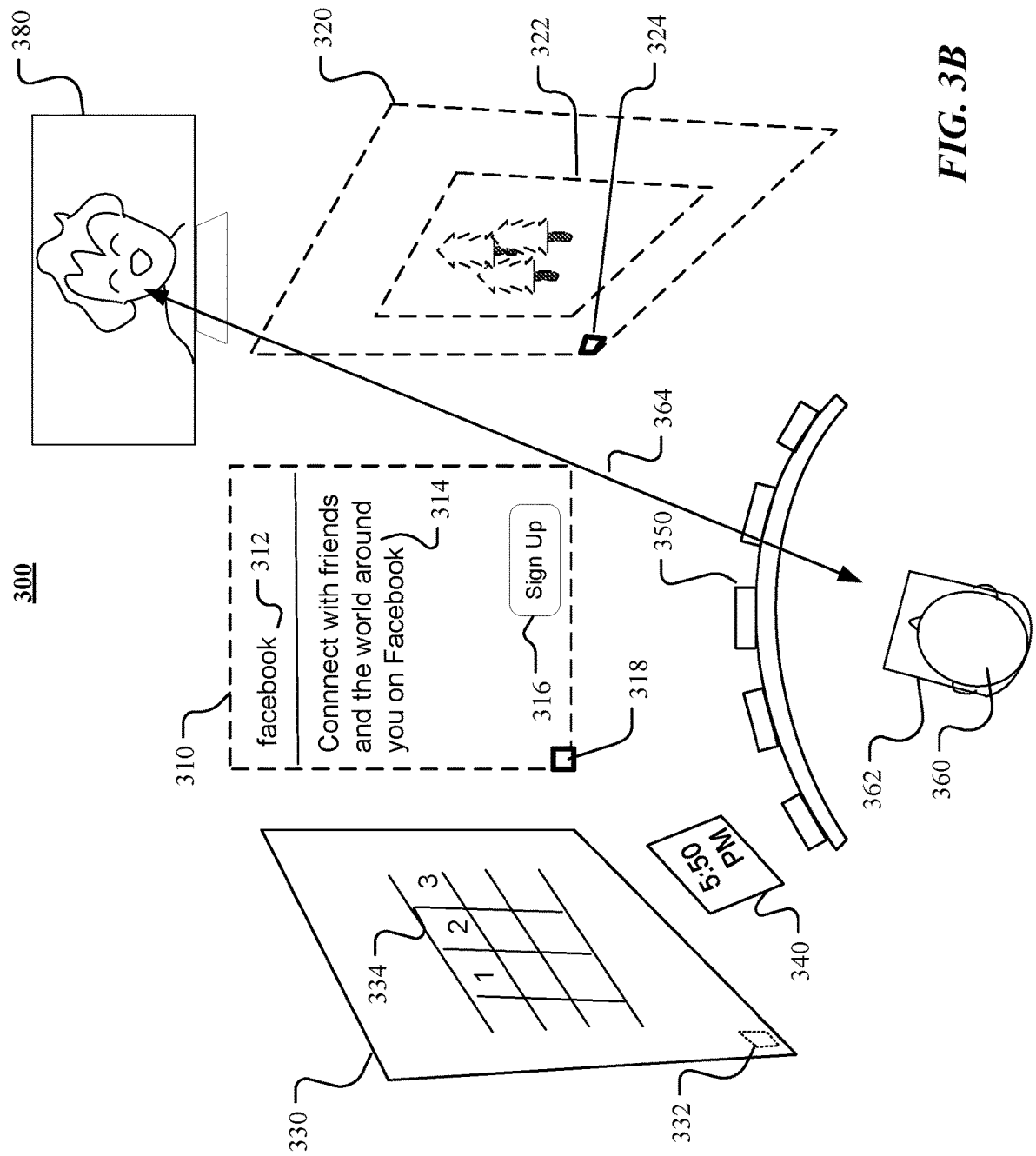
FIG. 3B illustrates an example usage of an artificial reality system by a user watching TV behind virtual display panels.

FIG. 3B illustrates an example usage of an artificial reality system 300 by a user 360 watching a TV 380 behind virtual display panels. The user 360 may use the virtual panels (e.g., 310, 320, 330, 340) for reading or working activities. The user 360 may occasionally watch a TV 380 which is partially behind the virtual panels 320 and partially behind the virtual panel 310. The system 300 may determine the vergence distance and gazing point of the user 360 using an eye tracking system. As soon as the user 360 moves his eyes from the virtual panels to the TV 380, the system 300 may detect that as an indication of the user 360 to look through the virtual panels (e.g., 310, 320) that interfere with the view of the user 360. For example, the system 300 may determine that the vergence distance of the user 360 is beyond the virtual panels (e.g., 310, 320) for a threshold distance and the virtual panels 310 and 320 are at least partially within the view of the user looking at the TV 380. The system 300 may change the opacity of the virtual panels 310 and 320 into transparent or translucent to allow the user to see through them. When the virtual panels 310 and 320 become transparent or translucent, the associated visual anchors 318 and 324 may be displayed at the corners of the transparent virtual panel 310 and 320, respectively. When the user 360 moves his eyes from the TV 380 back to the virtual panel 310 or 320, the user 360 just needs to focus on his eyes on the visual anchor 318 or 324. The system 300 may detect that the user is looking at the visual anchor 318 or 324 and change the corresponding panel 310 or 320 back to visible. The virtual panels 330 and 340 may or may not change since they are not interfering with the user view for watching the TV 380.

Figure 4:
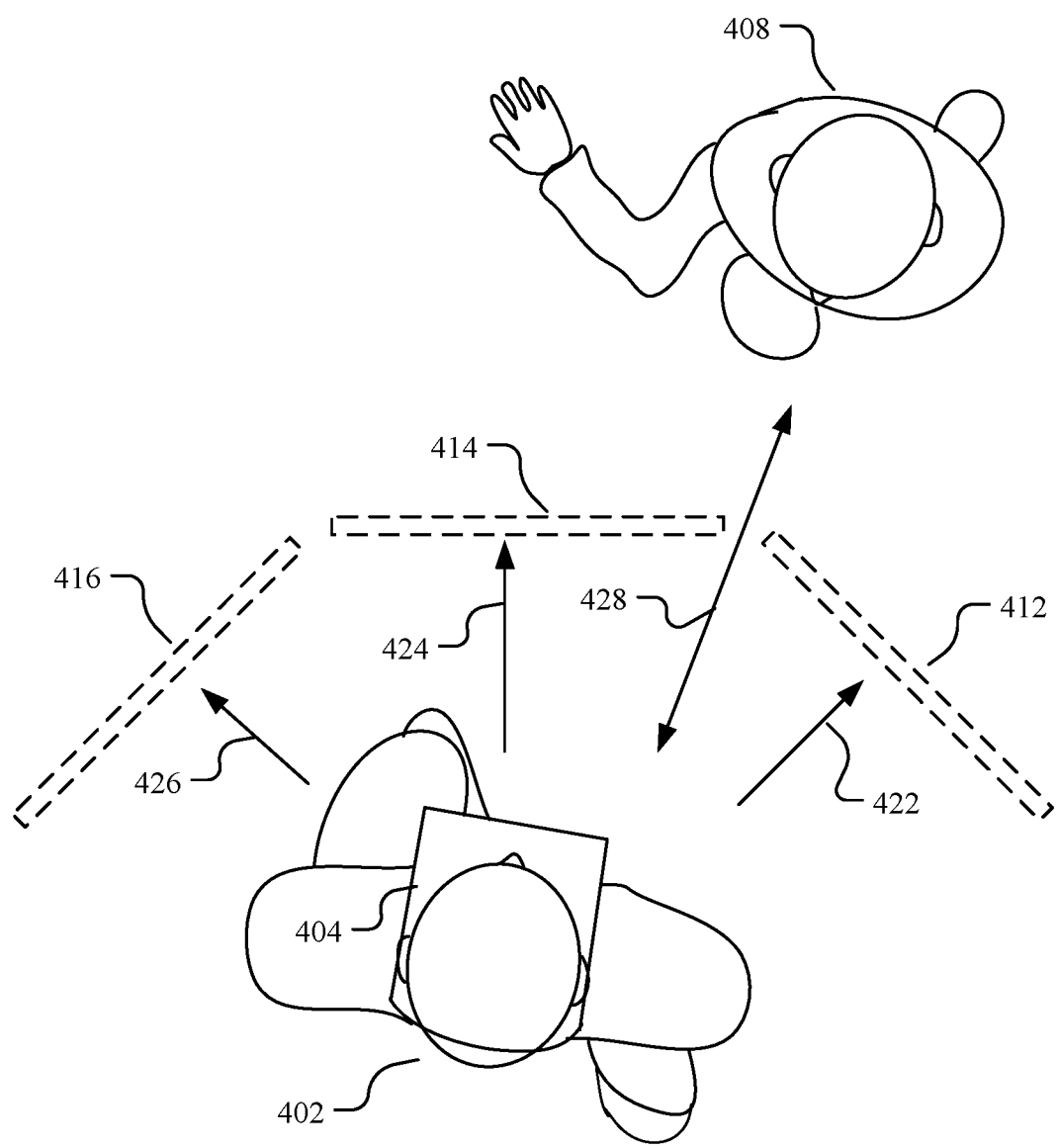
FIG. 4 illustrates an example usage of an artificial reality system by a first user walking and interacting with a second user.

FIG. 4 illustrates an example usage of an artificial reality system 400 by a first user 402 walking and interacting with a second user 408. The artificial reality system 400 may display a number of virtual panels (e.g., 412, 414, 416) to a first user 402 wearing the headset 404. The first user 402 may be walking on a street and using the headset 404 for navigating purpose. The virtual panels 412, 414, and 416 may display map information to the first user 402. The first user 402 may stop walking to look at the map information displayed on the virtual panels 412, 414, and 416. The virtual panels 412, 414, and 416 may be opaque to allow the first user 402 to have a clear view of the displayed information. The virtual panels 412, 414, and 416 may block the first user 402 from see through them. The system 300 may automatically change the opacity of the virtual panels 412, 414, and 416 when the user needs to look through them.

As an example and not by way of limitation, the system 400 may detect that the first user 402 starts to move (e.g., walking, running) after looking at the map information displayed on the virtual panels 412, 414, and 416. The system 400 may determine a moving direction (e.g., 422, 424, 426) of the first user 402. The system 400 may determine that one or more virtual panels may block or interfere with a view of the first user 402 along in the moving direction. For example, the virtual panels 412, 414, and 416 may block or interfere with the view of the first user moving in the directions of 422, 424, and 426, respectively. Upon detection of the motion of the first user, the system 400 may automatically reduce the opacity of the virtual panel in his moving direction to allow the user to see the environment. In particular embodiments, the system 300 may reduce the opacity of all virtual panels to allow the first user to have a clear view in any direction when the user starts to move.

As another example, the first user 402 may be standing and looking at the map information displayed on the virtual panels. The system 400 may detect a second user 408 in the field of view of the first user 402. The system 400 may detect a conservation between the first user 402 and the second user 408 based on the detected gesture or/and voice of the first and second users. The system 300 may automatically reduce the opacity of the virtual panels to allow the first user 402 to see the second user 408 without interference from the virtual panels. The system 300 may display a visual anchor for each virtual panel with reduced opacity and the first user may bring a virtual panel back by looking at the corresponding visual anchor.

As another example, the first user 402 may hear a sound from somewhere in the environment while looking at the map information displayed on the virtual panels. The first user 402 may move his eyes off the virtual panels to search the source of the sound in the environment. The gazing point of the first user 402 may be wandering around without focusing on any object in the view while searching the source of the sound in the environment. The system 300 may automatically reduce the opacity of the virtual panels to allow the first user 402 to see the environment without interference from the virtual panels. The system 300 may display a visual anchor for each virtual panel with reduced opacity and the first user may bring a virtual panel back by looking at the corresponding visual anchor.

Figure 5:
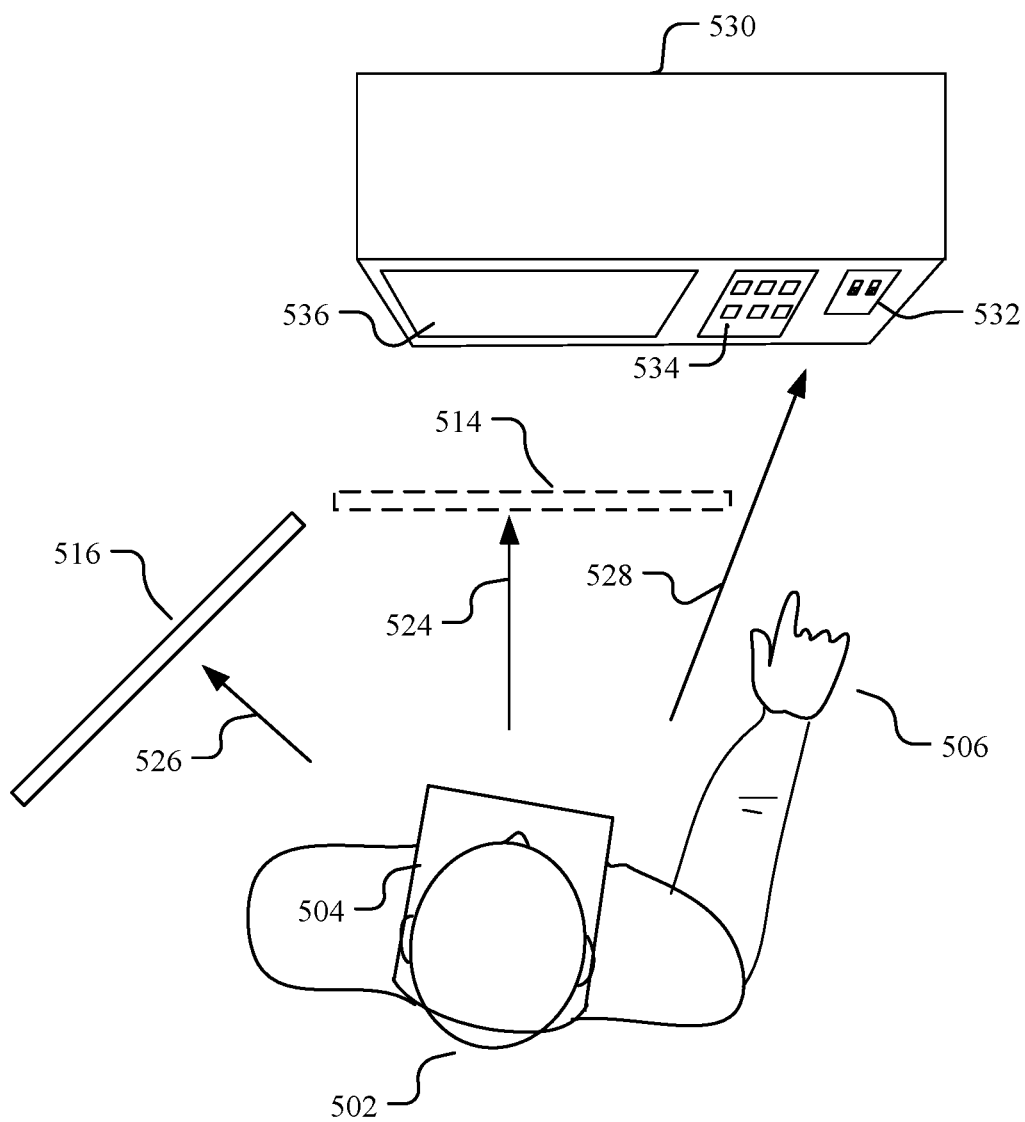
FIG. 5 illustrates an example usage of an artificial reality system by a user operating on a machinery.

FIG. 5 illustrates an example usage of an artificial reality system 500 by a user 502 operating on a machinery 530. The user 502 may wear the headset 504 while working on the machinery 530. The headset 504 may use one or more virtual panels (e.g., 514, 516) to display an operation manual or wire diagram to the user 502. The user 502 may move his/her eyes back and forth to look at the virtual panels 514, the virtual panel 516, and the machinery 530 at the directions of 524, 526, and 528, respectively. When the user 502 looks at the machinery 530 (e.g., a switch panel 532) along the direction 528, the virtual panel 514 may interfere with the view of the user 502. For example, the virtual panel 514 may block the user 502 from seeing at least a part (e.g., a display screen 536, an operating panel 534) of the machinery 528. The system 300 may track the user's vergence distance and gazing direction to automatically reduce the opacity of the virtual panel 514 when the user is looking at the machinery 530. The system 300 may make the virtual panel 514 disappear by turning it into transparent when the user looks at the machinery 530. In particular embodiments, the system 300 may dismiss all virtual panels (e.g., 514, 516) together or may dismiss the virtual panel (e.g., 514) that interferes with the view of the user 502. A visual anchor may be displayed for each disappeared virtual panel and the user 502 may look at the visual anchor to bring back the corresponding virtual panel associated with that visual anchor.

Figure 6:
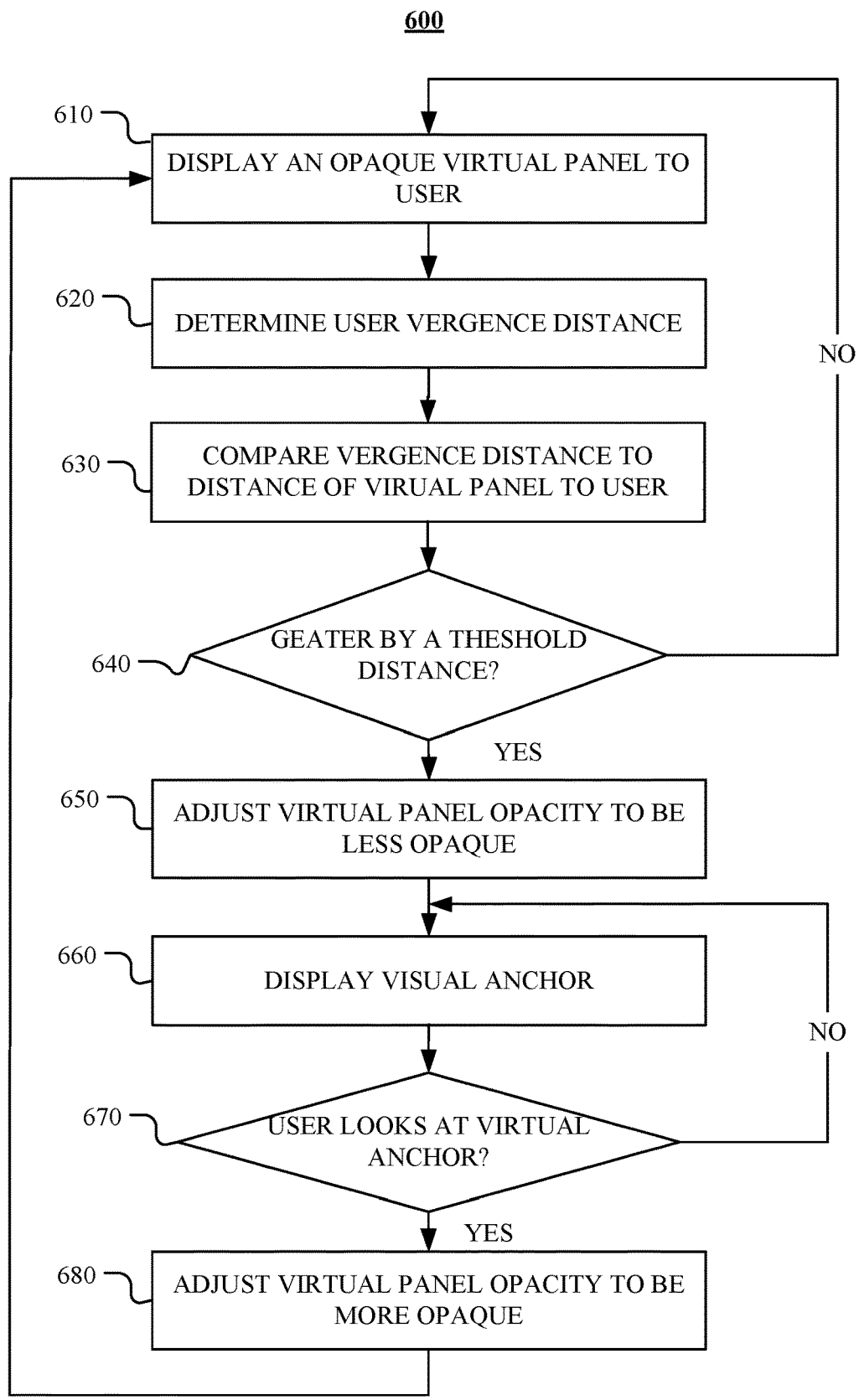
FIG. 6 illustrates an example method for changing display panel opacity based on a user's vergence distance.

FIG. 6 illustrates an example method 600 for changing display panel opacity based on a user's vergence distance. At step 610, the artificial reality system may use a virtual panel to display content (e.g., a computer screen, a website content, a document content, a picture, ect.) to the user. The virtual panel may have a first opacity (e.g., opaque) which allows the user to have a clear view of the displayed content on the virtual panel. The virtual panel having the first opacity may be opaque or partially opaque and may prevent the user from seeing through the virtual panel. At step 620, the system may determine the vergence distance (i.e., vergence depth) of the user using, for example, an eye tracking system. The vergence distance may be a distance from the user's eyes to a point at which the user's eyes are converged. At steps 630 and 640, the system may compare the vergence distance of the user to the distance between the virtual panel and the user to determine whether the user is looking at a point beyond the virtual panel. For example, the virtual panel may be displayed at a fixed distance of 1 m to the user. The system may compare the vergence distance of the user to the fixed distance of 1 m to determine whether the vergence distance exceeds the distance between the virtual panel and the user by a first threshold distance. The first threshold distance may correspond to the minimum vergence distance resolution of the eye tracking system. At step 650, when the vergence distance of the first user is greater than the distance between the virtual panel and the user by a first threshold distance, the system may adjust the opacity of the virtual panel to a second opacity which is less opaque than the first opacity. The virtual panel having the second opacity may allow the user to see through the virtual panel. For example, the virtual panel with the second opacity may be transparent and the virtual panel may be invisible to the user. The virtual panel may disappear from the view of the user when the system changes the virtual panel's opacity to the second opacity. As another example, the virtual panel may be translucent and may allow the user the see through.

At step 660, the system may display a visual anchor for the disappeared virtual panel. The visual anchor may be associated with the virtual panel and may be persistently displayed to the user in a uninstrusive manner, for example, at a corner of the virtual panel. The virtual anchor may be a corner-fitting object, a title bar, a wireframe, an element of displayed content, etc. At step 670, the system may determine whether the user is looking at the visual anchor. The system may compare the vergence distance of the user to the distance between the visual anchor and the user. When the difference between the vergence distance of the first user and the second distance between the visual anchor and the first user is within a second threshold distance, the system may determine that the user is looking at the visual anchor. At step 680, the system may make the virtual panel reappear by increasing the opacity of the virtual panel back to the first opacity or another opacity that makes the virtual panel visible to the user.

In particular embodiments, the method 600 may start at step 610 for displaying an opaque virtual panel to the user. The system may make the virtual panel disappear when the user looks beyond the virtual panel and make the virtual panel re-appear when the user looks at the visual anchor associated with the disappeared virtual panel. In particular embodiments, the method 600 may start at step 660 for displaying a visual anchor associated with a disappeared virtual panel. The system may make the virtual panel appear when the user looks at the visual anchor and make the virtual panel disappear when the user looks beyond the virtual panel. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for changing display panel opacity based on a user's vergence distance including the particular steps of the method of FIG. 6, this disclosure contemplates any suitable method for changing display panel opacity based on a user's vergence distance including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
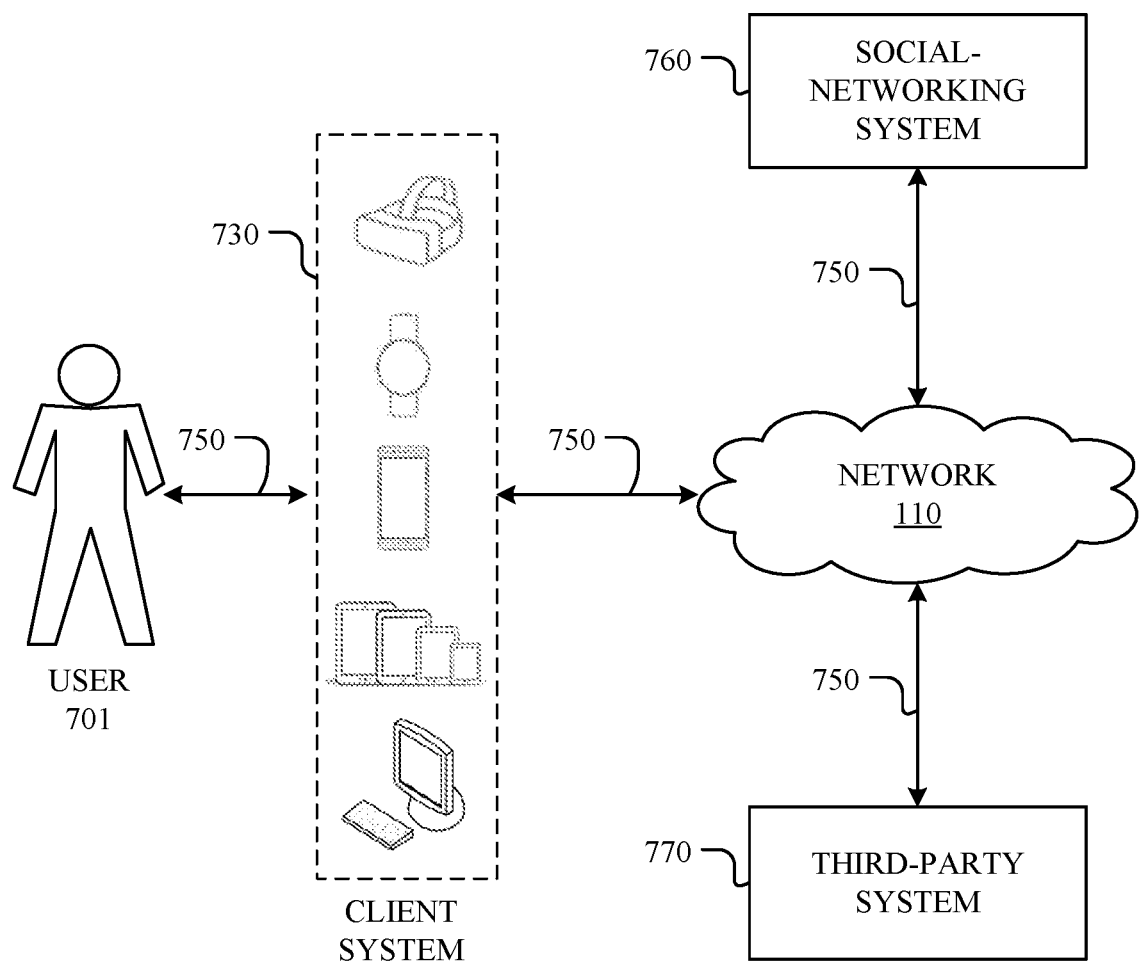
FIG. 7 illustrates an example network environment associated with a social-networking system.

FIG. 7 illustrates an example network environment 700 associated with a social-networking system. Network environment 700 includes a user 701, a client system 730, a social-networking system 760, and a third-party system 770 connected to each other by a network 710. Although FIG. 7 illustrates a particular arrangement of user 701, client system 730, social-networking system 760, third-party system 770, and network 710, this disclosure contemplates any suitable arrangement of user 701, client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of users 701, client systems 730, social-networking systems 760, third-party systems 770, and networks 710, this disclosure contemplates any suitable number of users 701, client systems 730, social-networking systems 760, third-party systems 770, and networks 710. As an example and not by way of limitation, network environment 700 may include multiple users 701, client system 730, social-networking systems 760, third-party systems 770, and networks 710.

In particular embodiments, user 701 may be an individual (human user), an entity (e.g., an enterprise, business, or third-party application), or a group (e.g., of individuals or entities) that interacts or communicates with or over social-networking system 760. In particular embodiments, social-networking system 760 may be a network-addressable computing system hosting an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. In particular embodiments, social-networking system 760 may include an authorization server (or other suitable component(s)) that allows users 701 to opt in to or opt out of having their actions logged by social-networking system 760 or shared with other systems (e.g., third-party systems 770), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 770 may be a network-addressable computing system. Third-party system 770 may be accessed by the other components of network environment 700 either directly or via network 710. In particular embodiments, one or more users 701 may use one or more client systems 730 to access, send data to, and receive data from social-networking system 760 or third-party system 770. Client system 730 may access social-networking system 760 or third-party system 770 directly, via network 710, or via a third-party system. As an example and not by way of limitation, client system 730 may access third-party system 770 via social-networking system 760. Client system 730 may be any suitable computing device, such as, for example, a personal computer, a laptop computer, a cellular telephone, a smartphone, a tablet computer, or an augmented/virtual reality device.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

Figure 8:
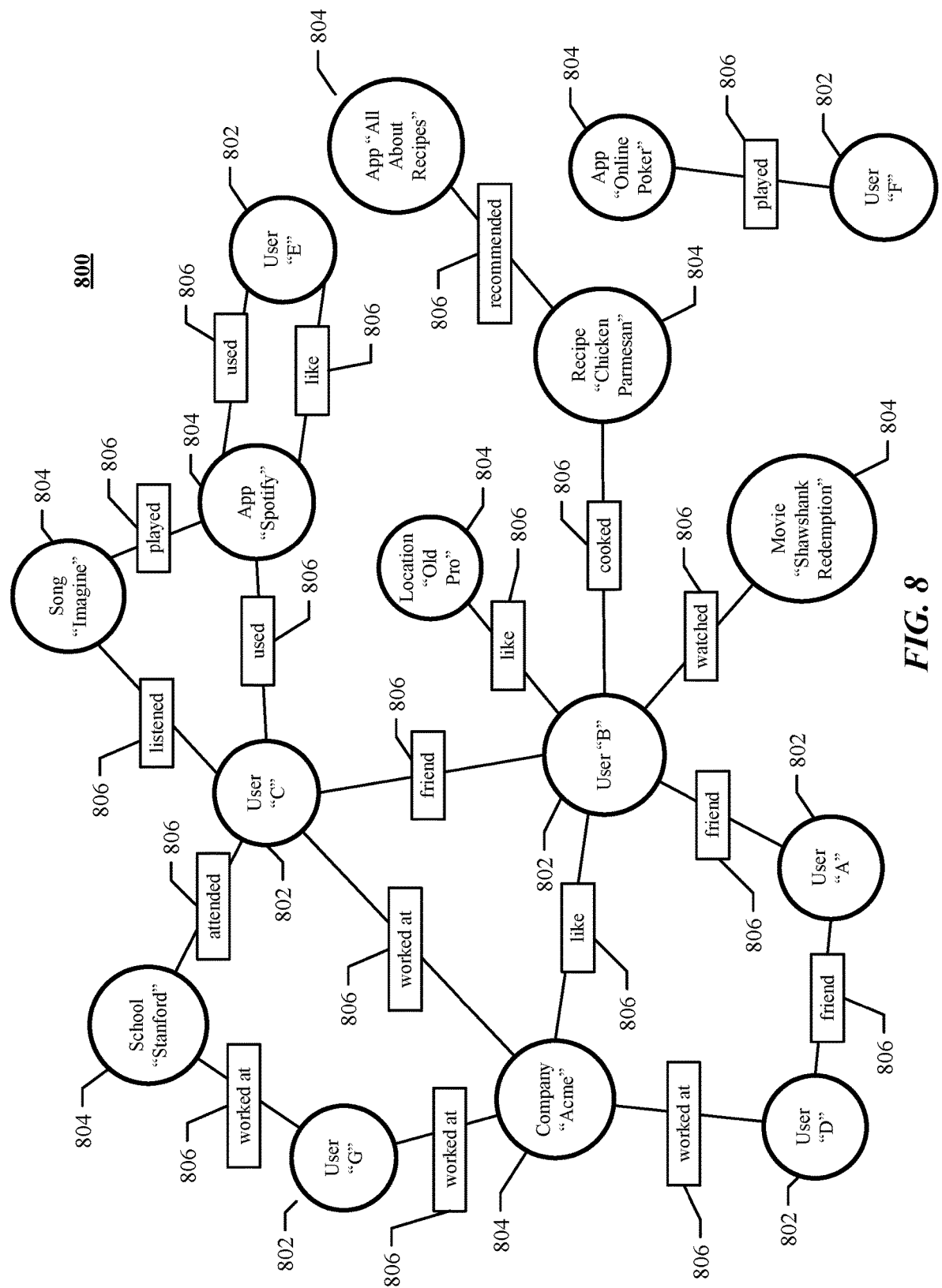
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Each node may be associated with a unique entity (i.e., user or concept), each of which may have a unique identifier (ID), such as a unique number or username. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party system 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 730 to send to social-networking system 760 a message indicating the user's action. In response to the message, social-networking system 760 may create an edge (e.g., a check-in-type edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806. The degree of separation between two objects represented by two nodes, respectively, is a count of edges in a shortest path connecting the two nodes in the social graph 800. As an example and not by way of limitation, in the social graph 800, the user node 802 of user "C" is connected to the user node 802 of user "A" via multiple paths including, for example, a first path directly passing through the user node 802 of user "B," a second path passing through the concept node 804 of company "Acme" and the user node 802 of user "D," and a third path passing through the user nodes 802 and concept nodes 804 representing school "Stanford," user "G," company "Acme," and user "D." User "C" and user "A" have a degree of separation of two because the shortest path connecting their corresponding nodes (i.e., the first path) includes two edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 760 may calculate a coefficient based on a user's actions. Social-networking system 760 may monitor such actions on the online social network, on a third-party system 770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 760 may calculate a coefficient based on the user's actions with particular types of content. The content may be associated with the online social network, a third-party system 770, or another suitable system. The content may include users, profile pages, posts, news stories, headlines, instant messages, chat room conversations, emails, advertisements, pictures, video, music, other suitable objects, or any combination thereof. Social-networking system 760 may analyze a user's actions to determine whether one or more of the actions indicate an affinity for subject matter, content, other users, and so forth. As an example and not by way of limitation, if a user frequently posts content related to "coffee" or variants thereof, social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 760 may calculate a coefficient based on the type of relationship between particular objects. Referencing the social graph 800, social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 760 may determine that the user has a higher coefficient with respect to the first photo than the second photo because having a tagged-in-type relationship with content may be assigned a higher weight and/or rating than having a like-type relationship with content. In particular embodiments, social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, social-networking system 760 may determine that the user has a higher coefficient for the airport than the gas station based on the proximity of the airport to the user.

In particular embodiments, social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 760 may provide information that is relevant to user's interests and current circumstances, increasing the likelihood that they will find such information of interest. In particular embodiments, social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, social-networking system 760 may calculate the coefficient (or access the coefficient information if it has previously been calculated and stored). In particular embodiments, social-networking system 760 may measure an affinity with respect to a particular process. Different processes (both internal and external to the online social network) may request a coefficient for a particular object or set of objects. Social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/502,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/622,869, filed 1 Oct. 2012, each of which is incorporated by reference.

Figure 9:
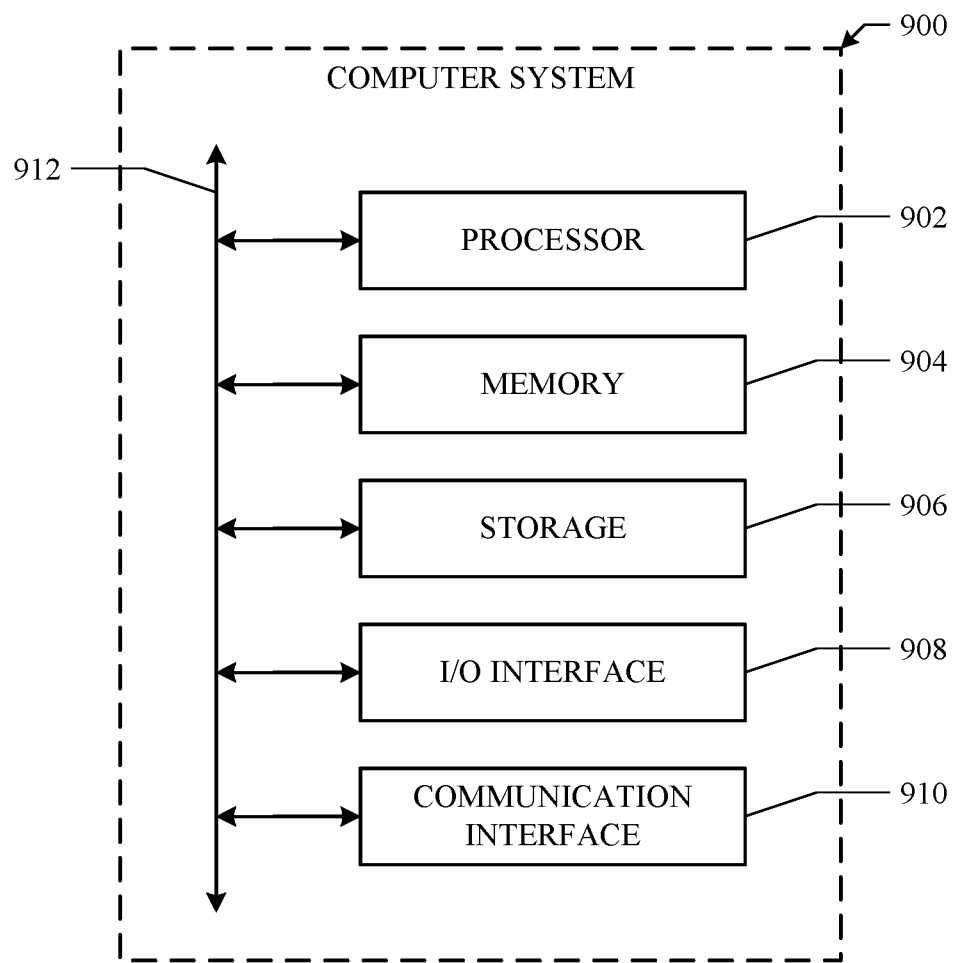
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

What is claimed is:

1. A method comprising, by a computing system:
displaying a virtual content to a first user in a three-dimensional space, wherein the virtual content has a first opacity;
determining a first vergence distance of the first user;
comparing the first vergence distance of the first user to a first distance between the virtual content and the first user;
adjusting the virtual content to have a second opacity that is less opaque than the first opacity in response to a determination that the first vergence distance of the first user is greater than the first distance by a first threshold distance, wherein the virtual content having the second opacity is associated with a visual anchor displayed at a position of the virtual content in the three-dimensional space;
determining that the first user is looking at a visual anchor based on a second vergence distance of the first user; and
adjusting the virtual content to be more opaque than the second opacity in response to the determination that the first user is looking at the visual anchor.

2. The method of claim 1, wherein the visual anchor has a third opacity that is more opaque than the second opacity.

3. The method of claim 1, wherein the visual anchor comprises one or more of:
a corner fitting object;
a wireframe of a virtual panel;
a title bar of the virtual panel;
a line associated with the virtual panel;
a dot associated with the virtual panel;
a content outline of the virtual panel;
an opaque display element of the virtual panel;
a translucent display element of the virtual panel;
a text content of the virtual panel;
an icon;
a translucent virtual panel; or
a virtual panel with a reduced size.

4. The method of claim 1, wherein the virtual content comprises one or more display elements on a virtual panel, and wherein adjusting the virtual content to have the second opacity comprises:
adjusting the virtual panel to have the second opacity; and
adjusting the one or more display elements on the virtual panel to have a fourth opacity, and wherein the fourth opacity is equal to or more opaque than the second opacity.

5. The method of claim 1, wherein the virtual content with the first opacity blocks the first user from seeing through the virtual content, and wherein the virtual content with the second opacity allows the first user to see through the virtual content.

6. The method of claim 1, further comprising determining that the virtual content interferes with a view of the first user.

7. The method of claim 6, wherein determining that the virtual content interferes with the view of the first user comprises:
determining a gazing direction of the first user using one or more sensors and an eye tracking system; and
determining that the virtual content is at least partially within a threshold angle to the gazing direction of the first user.

8. The method of claim 7, further comprising:
determining a gazing angle of the first user using the eye tracking system;
determining the view of the first user based on the gazing direction and the gazing angle of the first user; and
determining that the virtual content interferes with the view of the first user.

9. The method of claim 1, further comprising:
determining a moving direction of the first user using one or more sensors; and
determining that the virtual content interferes with a view of the first user along the moving direction of the first user, wherein adjusting of the virtual content to have the second opacity is based on the determination that the virtual content interferes with the view of the first user.

10. The method of claim 1, further comprising:
identifying a face of a second user in a field of view of the first user using one or more cameras and a face recognition model;
capturing a voice of the first or second user using one or more microphones; and
determining an interaction between the first and second users, wherein adjusting the virtual content to have the second opacity is based on the determined interaction between the first and second users.

11. The method of claim 1, further comprising:
identifying a face of a second user in a field of view of the first user using one or more cameras and a face recognition model; and
determining a social relevance score of the second user to the first user based on a social graph of a social network system, and wherein adjusting the virtual content to have the second opacity is based on a determination that the social relevance score is above a threshold.

12. The method of claim 1, wherein the first vergence distance of the first user is determined based on one or more factors associated with an object that the first user is looking at, and wherein the one or more factors comprise one or more of:
a gesture of the first user;
a voice command of the first user;
a correlation between the object and a behavior of the first user;
a selection of the first user; or
an input of the first user.

13. The method of claim 1, further comprising relocating the virtual content to a new location to avoid interfering with a view of the first user.

14. The method of claim 1, further comprising resizing the virtual content to a smaller size to avoid interfering with a view of the first user, wherein the resized virtual content is displayed as a visual anchor associated with the virtual content.

15. The method of claim 1, wherein adjusting the virtual content to have the second opacity comprises adjusting the virtual content gradually from the first opacity to the second opacity based on a change of the first vergence distance of the first user.

16. The method of claim 1, wherein adjusting the virtual content to have a second opacity comprises adjusting the virtual content gradually from the first opacity to the second opacity in a speed corresponding to a changing speed of the first vergence distance of the first user.

17. The method of claim 1, wherein the first vergence distance of the first user is determined using an eye tracking system or using one or more cameras associated with a third-party system.

18. The method of claim 1, wherein the visual anchor is displayed persistently before and after the opacity of the virtual content is adjusted to be less opaque.

19. The method of claim 1, wherein the visual anchor is displayed after the opacity of the virtual content is adjusted to be less opaque.

20. The method of claim 1, further comprising:
determining that the first user is looking at an object in the three-dimensional space based on a determination that a first motion of a gazing point of the first user corresponds to a second motion of an object in the three-dimensional space, wherein at least at a portion of the virtual content is between the first user and the object, and wherein the virtual content is adjusted to be less opaque in response to the determination that the first user is looking at the object in the three-dimensional space.

21. One or more non-transitory computer-readable storage media embodying software that is operable when executed by a server computing device to:
display a virtual content to a first user in a three-dimensional space, wherein the virtual content has a first opacity;
determine a first vergence distance of the first user;
comparing the first vergence distance of the first user to a first distance between the virtual content and the first user;
adjust the virtual content to have a second opacity that is less opaque than the first opacity in response to a determination that the first vergence distance of the first user is greater than the first distance by a first threshold distance, wherein the virtual content having the second opacity is associated with a visual anchor displayed at a position of the virtual content in the three-dimensional space;
determine that the first user is looking at a visual anchor based on a second vergence distance of the first user; and
adjust the virtual content to be more opaque than the second opacity in response to the determination that the first user is looking at the visual anchor.

22. A system comprising:
one or more non-transitory computer-readable storage media embodying instructions;
one or more processors coupled to the storage media and operable to execute the instructions to:
display a virtual content to a first user in a three-dimensional space, wherein the virtual content has a first opacity;
determine a first vergence distance of the first user;
comparing the first vergence distance of the first user to a first distance between the virtual content and the first user;
adjust the virtual content to have a second opacity that is less opaque than the first opacity in response to a determination that the first vergence distance of the first user is greater than the first distance by a first threshold distance, wherein the virtual content having the second opacity is associated with a visual anchor displayed at a position of the virtual content in the three-dimensional space;
determine that the first user is looking at a visual anchor based on a second vergence distance of the first user; and
adjust the virtual content to be more opaque than the second opacity in response to the determination that the first user is looking at the visual anchor.

* * * * *